(12) United States Patent
Pruett et al.

(10) Patent No.: US 6,170,059 B1
(45) Date of Patent: Jan. 2, 2001

(54) TRACKING MEMORY MODULES WITHIN A COMPUTER SYSTEM

(75) Inventors: Gregory B. Pruett, Durham; Gregory W. Kilmer; James Peter Ward, both of Raleigh, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/113,831

(22) Filed: Jul. 10, 1998

(51) Int. Cl.$^7$ ..................................................... G06F 11/00
(52) U.S. Cl. ............................................................ 713/200
(58) Field of Search ..................................... 713/200, 201, 713/202; 380/3, 4, 10, 19, 23, 25, 49, 20; 340/825.34, 825.31; 235/382.5, 382

(56) References Cited

U.S. PATENT DOCUMENTS

| | | | |
|---|---|---|---|
| 5,151,684 | * 9/1992 | Johnsen | 340/572 |
| 5,629,981 | * 5/1997 | Nerlikar | 380/25 |
| 5,709,114 | * 1/1998 | Dawson et al. | 70/278 |
| 5,745,036 | * 4/1998 | Clare | 340/572 |
| 5,787,174 | * 7/1998 | Tuttle | 380/23 |
| 5,889,471 | * 3/1999 | Glehr et al. | 340/825.31 |
| 5,910,776 | * 6/1999 | Black | 340/825.35 |
| 6,040,774 | * 3/2000 | Schepps | 340/572.1 |
| 6,043,746 | * 3/2000 | Sorells | 340/572.7 |
| 6,070,171 | * 5/2000 | Snyder et al. | 707/203 |

* cited by examiner

*Primary Examiner*—Nadeem Iqbal
(74) *Attorney, Agent, or Firm*—George E. Grosser; Joseph A. Sawyer, Jr.

(57) ABSTRACT

The present invention is directed toward a method, system and computer readable medium (the present invention) for tracking memory modules in a computer system. The present invention includes identifying each of the memory modules based upon identification information added to each of the memory modules by their manufacturer to provide a unique serial number by each of the memory modules; and providing the unique serial number to a display via a browser. The identification information comprises electronically readable information which is preferably stored in an electronically erasable programmable read only memory (EEPROM) and from which the unique serial numbers are generated for identifying the memory modules. One aspect of the present invention further includes comparing the unique serial numbers with corresponding last known serial numbers, wherein a mismatch in the serial numbers indicates that the corresponding memory modules have been replaced. Another aspect of the present invention further includes copying the unique serial numbers to a radio frequency (RF) enabled memory, wherein the unique serial numbers can be logged utilizing an RF reader means. The RF reader may be included in an RF gate and/or a hand held device. Computer systems with Radio Frequency Identification (RFID) technology configured in accordance with the present invention enable automated electronic tracking of computer assets such as the memory modules as they pass through the RF gate in or out of a portal.

28 Claims, 8 Drawing Sheets

UNIQUE IDENTIFICATION
306

| ADDR | 128 | ... | | | | | | | | | | | | 149 | 150 |
|---|---|---|---|---|---|---|---|---|---|---|---|---|---|---|---|
| CHAR | 1 | 1 | S | A | 1 | D | I | M | M | 0 | 0 | 0 | ... | 0 | A |
| VALUE | 31 | 31 | 53 | 41 | 31 | 44 | 49 | 4d | 4d | 30 | 30 | 30 | 30 | 30 | 30 | 30 | 30 | 30 | 30 | 30 | 30 | 41 |

FIG. 4D

JEDEC SERIAL PRESENCE DETECT (SPD) DATA
352

| ADDR | 64 | ... | 91 | 92 | 93 | 94 | 95 | 96 | 97 | 98 |
|---|---|---|---|---|---|---|---|---|---|---|
| VALUE | 10 | | 31 | 20 | 0e | 61 | ae | 00 | 8c | 17 |

GENERATED ASCII SERIAL NUMBER
350

| CHAR | 1 | 0 | 3 | 1 | 2 | 0 | 0 | E | 6 | 1 | A | E | 0 | 0 | 8 | C | 1 | 7 |
|---|---|---|---|---|---|---|---|---|---|---|---|---|---|---|---|---|---|---|
| VALUE | 31 | 30 | 33 | 31 | 32 | 30 | 30 | 45 | 36 | 31 | 41 | 45 | 30 | 30 | 38 | 43 | 31 | 37 |

TRACKING MEMORY MODULES WITHIN A COMPUTER SYSTEM

FIELD OF THE INVENTION

The present invention relates to computer systems assets tracking and protection and more particularly to electronic tracking and protection of memory modules.

DESCRIPTION OF RELATED ART

Personal computer and workstation systems (computers) are well known in the art. Computers include components such as hard disk drives, dual in line memories (DIMMs), single in-line memories (SIMMs), monitors, central processing units (CPUs), and other components. Computers and their respective components, are highly valuable assets. At the same time, computers and computer components are easily portable and easily reconfigured. The more compact the computers and the computer components the easier it is to transport them. Moreover, the more conforming the computers and computer components are to industry standards the easier it is to reconfigure the computers with exchanged or stolen components.

Thus, assets management, misplacement and theft of computers and computer components present a major problem. As a result, there exists an ever increasing need for improved computer assets management and protection such as security for computers against the unauthorized removal or theft of their components.

In addition, today, computer networks (networks) are employed to provide increased computing power and efficiency to a plurality of computers which are located throughout a large area. Through the network, the plurality of computers are generally interlinked with each other and with a server system or a central processing center. However, the dissemination of the computers throughout the large area compounds the computer assets tracking and protection problem.

Computers provided by IBM Corporation currently carry a tamper detection switch, which can detect when a computer cover has been removed and causes the computers to be functionally disabled on subsequent boots until the user successfully enters an appropriate password. This and other similar mechanisms adequately protects the overall computer system but does not deter theft of the components within the computer, nor does it provide means for tracking computer assets.

Accordingly, a number of methods have been developed for guarding against the unauthorized removal of computer assets. One such method is the use of Electronic Article Surveillance (EAS) tags which are widely used in commercial markets for everything from clothing to Compact Disks. When an item with an EAS tag is carried through a portal, the portal sounds an audible alarm to notify security of a tamper event. The EAS tags are attached or embedded in computer systems to provide a notification of when an asset is removed.

Although useful for retail applications, EAS technology is less effective for protecting corporate assets such as computers and computer components. Opportunities may exist for employees to defeat the technology by removing the tags, transferring components through a mail service, or reusing components in other computers within the building.

A second method for guarding against unauthorized removal of computer assets is attaching to them bar code labels which are then readable by bar code readers. However, to read the bar code labels, a direct unobstructed sight line to each of the bar code labels is required. Since computer assets inside a computer will have to be extracted or exposed in order to allow viewing of their bar code labels, this method is ineffective for electronically tracking and protecting computer assets including memory modules.

It is therefore desirable to provide a system and method that provide electronic tracking and protection of computer assets including memory modules. The tracking and protection of computer assets should be automated and easily implemented in various computer systems environments. The present invention addresses such a need.

SUMMARY OF THE INVENTION

The present invention is directed toward a method, system and computer readable medium (the present invention) for tracking memory modules in a computer system. The present invention includes identifying each of the memory modules based upon identification information added to each of the memory modules by their manufacturer to provide a unique serial number by each of the memory modules; and providing the unique serial number to a display via a browser. The identification information comprises electronically readable information which is preferably stored in an electronically erasable programmable read only memory (EEPROM) and from which the unique serial numbers are generated for identifying the memory modules.

One aspect of the present invention further includes comparing the unique serial numbers with corresponding last known serial numbers, wherein a mismatch in the serial numbers indicates that the corresponding memory modules have been replaced. Another aspect of the present invention further includes copying the unique serial numbers to a radio frequency (RF) enabled memory, wherein the unique serial numbers can be logged utilizing an RF reader means.

The RF reader may be included in an RF gate and/or a hand held device. Computer systems with Radio Frequency Identification (RFID) technology configured in accordance with the present invention enable automated electronic tracking of computer assets such as the memory modules as they pass through the RF gate in or out of a portal. Computer systems with the RFID technology also enable the automated electronic tracking of the hard disk drives or other computer assets via the hand held device. In either case, no direct contact with the memory module is needed for the tracking and reporting.

DETAILED DESCRIPTION OF THE INVENTION

The present invention relates to computer systems assets tracking and protection and more particularly to electronic tracking and protection of memory modules. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In accordance with the present invention, the system and method for an automated electronic tracking and protection of memory modules utilize memory modules identification for monitoring and reporting their presence in a computer. Memory modules identification, also known as serialization information (serialization), includes information such as a serial number, a vendor identification, a revision code and a date code. The present invention takes advantage of the fact that memory modules identification is electronically readable from the memory modules. From this information, the system and method in accordance with the present invention derive the serial numbers of the memory modules which are present in the computer.

The serial numbers are preferably logged in a radio frequency (RF)-enabled EEPROM through a serial bus interface, and an RF reader obtains the serial numbers through an RF link to the RF-enabled EEPROM. Preferably, the serial numbers are also logged for future reference in a computer file which holds the last known computer configuration data.

Electronically generating and reporting of the serial numbers via a browser such as, in a preferred embodiment, a Desktop Management Interface (DMI) browser, and/or via the RF link to the RF reader, automates the tracking and protection of the memory modules. The RF reader can be included, for example, in RF gates installed in portal entryways or in hand held devices. Hence, there is no need for direct connection to the memory modules in order to provide the automated electronic tracking and protection thereof.

In the preferred embodiment, the system and method in accordance with the present invention additionally utilize a software program such as, for example, the AssetCare software program by IBM corporation, for implementing the automated tracking and protection of memory modules. In this case, the software program is executed by the computer under an operating system such as Windows NT, Windows 95, or OS/2. The operating system and the software program each comprises computer readable instructions which, in general, are tangibly embodied in or are readable from a media such as a system memory, data storage devices including hard disk drives, and/or a data communications device. When executed by the computer, the instructions cause the computer to perform steps associated with implementing the present invention. Thus, the automated tracking and protection of memory modules may be implemented as a method, system, or an article of manufacture (a computer-readable media or device) using programming and/or engineering techniques to produce software, hardware, firmware, or any combination thereof.

Figure 1:
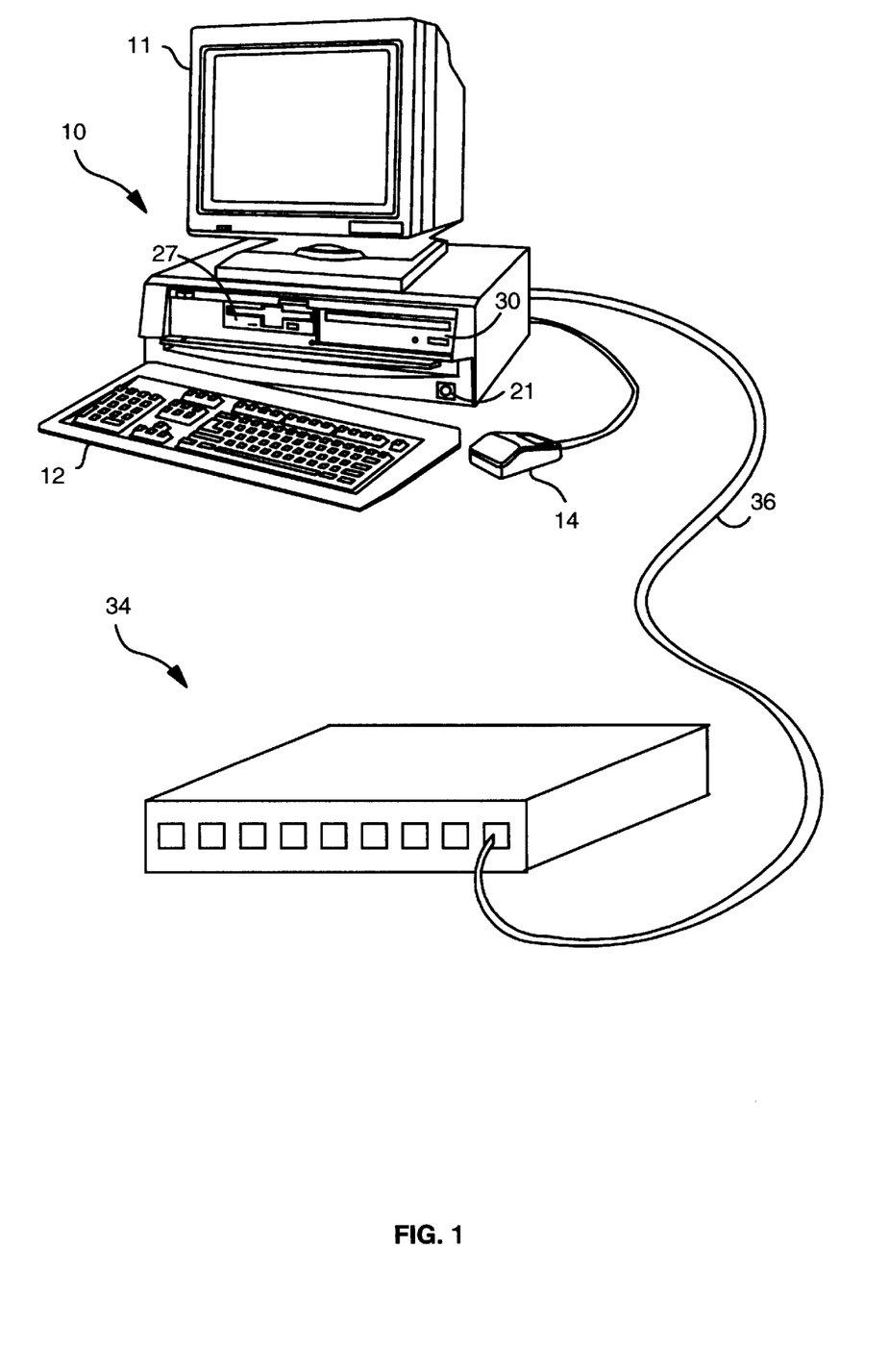
FIG. 1 illustrates a computer embodying the system and method in accordance with the present invention which can be connected to a network through a hub.

The system and method are implemented in personal computer and workstation systems (computers) as hereafter described. A computer 10 embodying the system and method in accordance with the present invention is illustrated in FIG. 1. The computer 10 may have an associated display monitor 11, keyboard 12, mouse 14, and printer or plotter (not shown). The computer 10 is typically connected to a network of one type or another including Ethernet, Token Ring, ATM, or other mechanism used to transmit data.

In the preferred embodiment the network is a local area network (LAN). A LAN attachment is provided, for example, through hub 34 which is connected to the computer 10 via a cable 36, wherein effective communication may be established with other computers through links comprising electrically conductive connections and/or radiation links including fiber optic links and infrared links. The other computers may be physically remote from or, conversely, adjacent to computer 10. Each of the computers may be a personal computer or workstation system in the form of a desktop, floor standing or portable computer. Alternatively, one or more of the computers may comprise a computer system which is different than the personal computer or workstation systems in that it is differently configured and/or it has different functional capabilities.

Figure 2:
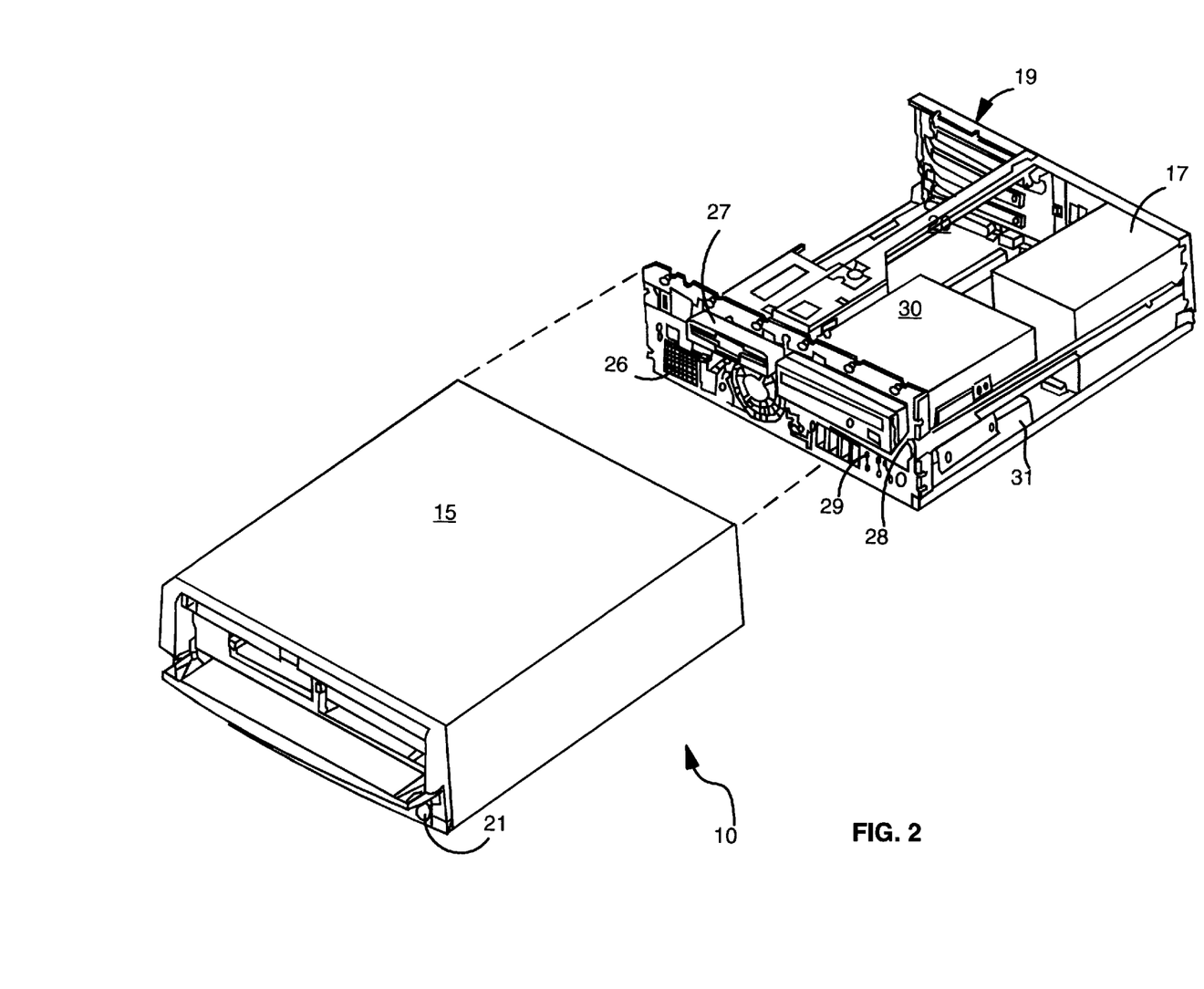
FIG. 2 is a more detailed description of the computer of FIG. 1 which embodies the system and method in accordance with the present invention.

A more detailed description of the computer 10 which embodies the system and method in accordance with the present invention is provided in conjunction with FIG. 2. As illustrated in FIG. 2, the computer 10 has a cover 15 which is a decorative outer member that cooperates with a chassis 19 in defining an enclosed, shielded volume for receiving electrically powered data processing and storage components for processing and storing digital data. At least some of these components are mounted on a multi layer planar 20 or motherboard which is mounted on the chassis 19. The multilayer planar 20 provides means for electrically interconnecting the components of the computer 10 including those identified above and such other associated components as floppy disk drives, various forms of direct access storage devices, accessory adapter cards or boards, and the like. Provisions are made in the planar 20 for the passage of input/output signals to and from the components of the computer 10.

The system 10 has a power supply 17, a power button 21, also herein referred to as switch 21. In the illustrated form, the chassis 19 defines a pair of upper bays 26, 28 and a lower bay 29. One of the upper bays 26 is adapted to receive peripheral drives of a first size (such as those known as 3.5 inch drives) while the other 28 is adapted to receive drives of a different size (such as a CD ROM drive). The lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30, both in FIGS. 1 and 2, and is a removable medium direct access storage device capable of receiving a compact disc inserted there into and using the disc to deliver data as is generally known. One hard disk drive is indicated at 31 in FIG. 2 and is a fixed medium direct access storage device (hard disk drive) capable of storing and delivering data as is generally known.

Figure 3:
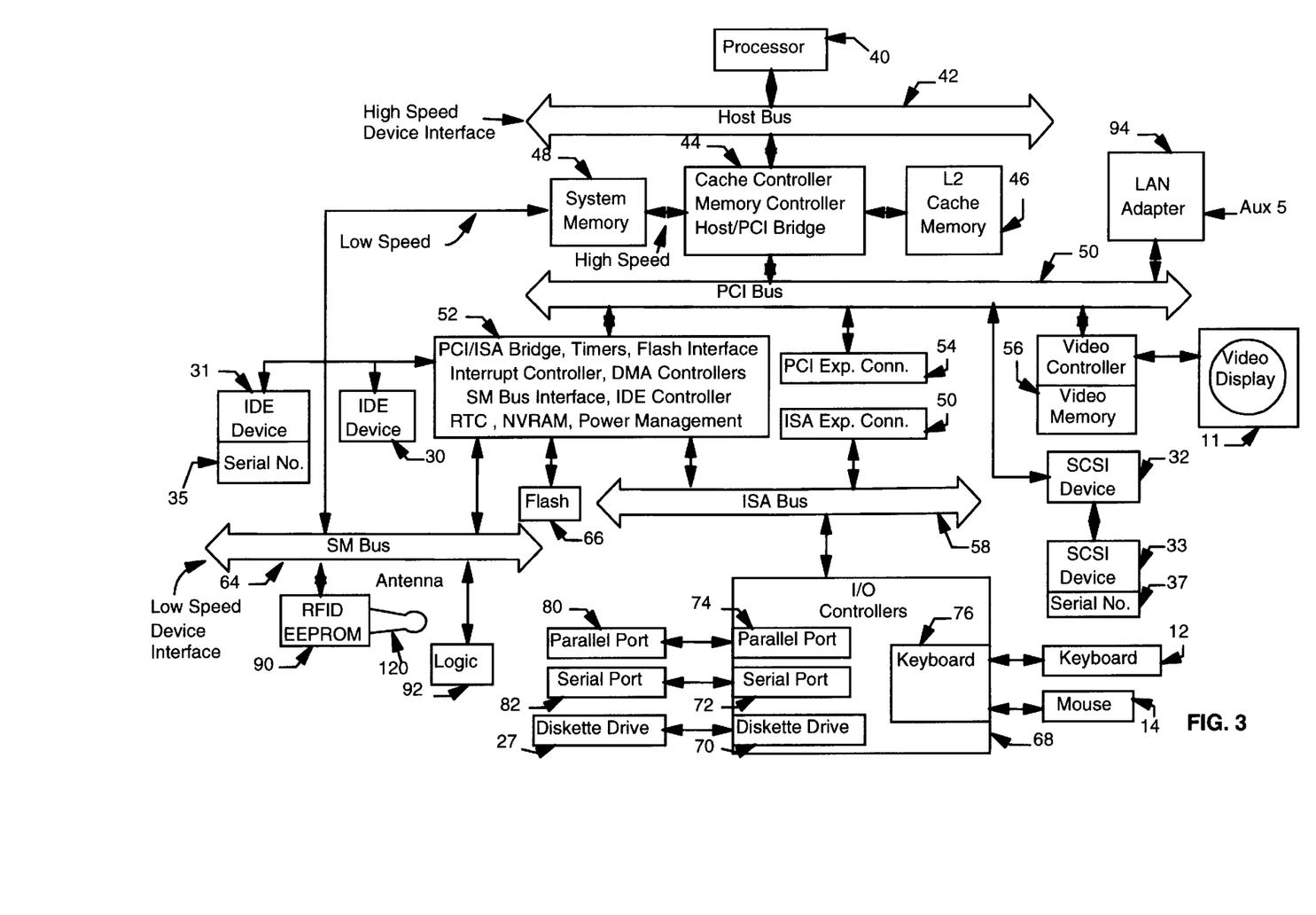
FIG. 3, illustrates a block diagram of a computer configured in accordance with the present invention such as the computer of FIGS. 1 and 2.

The above described computer 10 of FIGS. 1 and 2 is described in further detail in conjunction with FIG. 3. FIG. 3, illustrates a block diagram of a computer configured in accordance with the present invention such as the computer 10 of FIGS. 1 and 2. The computer 10 includes the planar 20 for mounting components on the planar 20. The planar 20 is connected to input/output (I/O) expansion connectors and other computer hardware such as the system central processing unit (CPU) or processor 40, which is further connected to a high speed CPU host bus 42.

Connected to the high speed CPU host bus 42 are also a first system core logic chipset 44 and an L2 cache memory 46. The first chipset 44 can be, for example, a Triton VX chip by Intel Corporation. The first chipset 44 includes a memory control unit, a cache controller and a peripheral component interconnect (PCI) bridge. The cache controller is operatively coupled to the L2 cache memory 46. The memory control unit includes memory mapping logic for mapping CPU 40 addresses to particular address spaces in system memory 48. The memory control unit is coupled to the system memory 48.

The system memory 48 comprises a random access memory (RAM) and one or more of dual in-line memory modules (DIMMs) and single in-line memory modules (SIMMs). The memory modules include the electronically readable identification in a designated space. In the preferred embodiment, the memory modules include an EEPROM (electronically erasable programmable read only memory) within which the memory module identification (including a vendor serial number 49) is fixed by the vendors. The system memory 48 is further connected to a low speed serial bus such as an I$^2$C bus or a System Management (SM) bus. In the preferred embodiment, the EEPROM is accessed via the serial bus.

The PCI bridge within the first chipset 44 provides an interface between the CPU host bus 42 which is used as a local bus and a PCI bus 50. Coupled to the PCI bus 50 is a second core chipset 52. The second chipset 52 can be, for example, a PIIX4 chip by Intel Corporation. The second chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an SM bus controller, a PCI/ISA bridge, flash memory interface, power management logic and an integrated drive electronics (IDE) controller. Attached to the second chipset 52 is a flash memory (FM) module or chip 66.

The RTC is used for time of day calculations and the NVRAM is used to store computer system configuration data. That is, the NVRAM will contain values which describe the present configuration of the computer including the types of components associated therewith, the amount of system memory, etc. These values are stored in and updated whenever a special configuration program, such as configuration/setup, is executed.

The power management logic within the second chipset 52 manages switching between computer power states such as off, standby, sleep, suspend and normal operating states. The present invention will operate in any of these power states. Accordingly, the description that follows will be independent of power state.

The PCI/ISA bridge within the second chipset 52 provides an interface between the PCI bus 50 and an optional feature or expansion bus such as the Industry Standard Architecture (ISA) bus 58. Coupled to the ISA bus 58 is a multi-function I/O controller 68 such as the PC87307 by National Semiconductor. The I/O controller 68 contains a variety of I/O adapters and other components such as a diskette adapter 70, a serial adapter 72, a parallel adapter 74 and a keyboard controller 76. The diskette adapter 70 provides an interface to the diskette drive 27. The serial adapter 72 has an external port connector 82 for attachment of external devices such as a modem (not shown). The parallel adapter 74 has an external port connector 80 for attachment of external devices such as printers (not shown). The keyboard controller 76 is the interface for the keyboard 12 and the mouse 14. Additionally coupled to the ISA bus 58 are a plurality of ISA expansion connectors 60 for receiving ISA adapter cards (not shown).

The IDE controller within the second chipset 52 interfaces with IDE compatible storage devices such as the hard disk drive 31 and CD-ROM drive 30. In addition to the second chipset 52, coupled to the PCI bus 50 are a plurality of PCI expansion connectors 54 for receiving PCI bus compatible peripheral cards. One such peripheral card is a video controller 56. The video controller 56 includes video memory and is coupled to the monitor or video display terminal 11. Another peripheral card is a small computer system interface (SCSI) controller 32 which is coupled to a SCSI device such as a SCSI hard disk drive 33.

Hence, the computer 10 configuration illustrated in FIG. 3 supports both the IDE and SCSI hard disk drives 31 and 33. However, one of ordinary skill in the art can readily recognize that the computer 10 may alternatively be configured to support any hard disk drive(s) including either one or both of the IDE and SCSI hard disk drives.

A LAN adapter or subsystem 94 can be coupled to either the PCI bus 50 or the ISA bus 58 for allowing the computer 10 to communicate with the LAN via a connection or link 36 to hub 34 (FIG. 1). The LAN adapter is supplied with auxiliary power (AUX5) from the power supply 17 when the system 10 is off. The LAN adapter can be, for example, the Auto Wake Token-Ring ISA Adapter by IBM corporation.

Further, a planar SM Bus 64 is coupled to the PCI bus 50 and the ISA bus 58 via the SM bus controller within the second chipset 52. The planar SM Bus 64 is an additional I/O bus in computer 10 and is used as a local bus to support slow speed peripheral devices. Logic 92 is coupled to SM bus 64.

An RFID (Radio Frequency Identification) EEPROM 90 is coupled to the SM Bus 64 and an RF interface. In a preferred embodiment, the RFID EEPROM 90 is a dual ported non-volatile memory element with both a digital serial (I$^2$C) and an RF interface. Hence, is it an RF-enabled EEPROM. The non-volatile memory provides storage for computer assets information such as components serial number including the memory modules serial number 49 and code revisions for the computer 10. The RFID EEPROM 90 can be updated through a digital interface that connects to the SM bus 64 or through the RF interface which connects to an antenna 120 which provides the RF link to the RF reader.

While the present invention is described hereinafter with particular reference to the block diagram of FIG. 3, it is to be understood that the system and method in accordance with the present invention may be used with other hardware configurations, including different planar board configurations. For example, the system processor 40 can be an Intel Pentium processor, Cyrix 586-P75 processor or Advanced Micro Devices 80486 processor or any other suitable processor. Also, for example, the system memory 48 can include one or more of the DIMMs and SIMMs as hereafter described in conjunction with FIGS. 4A–4F.

Figure 4A:
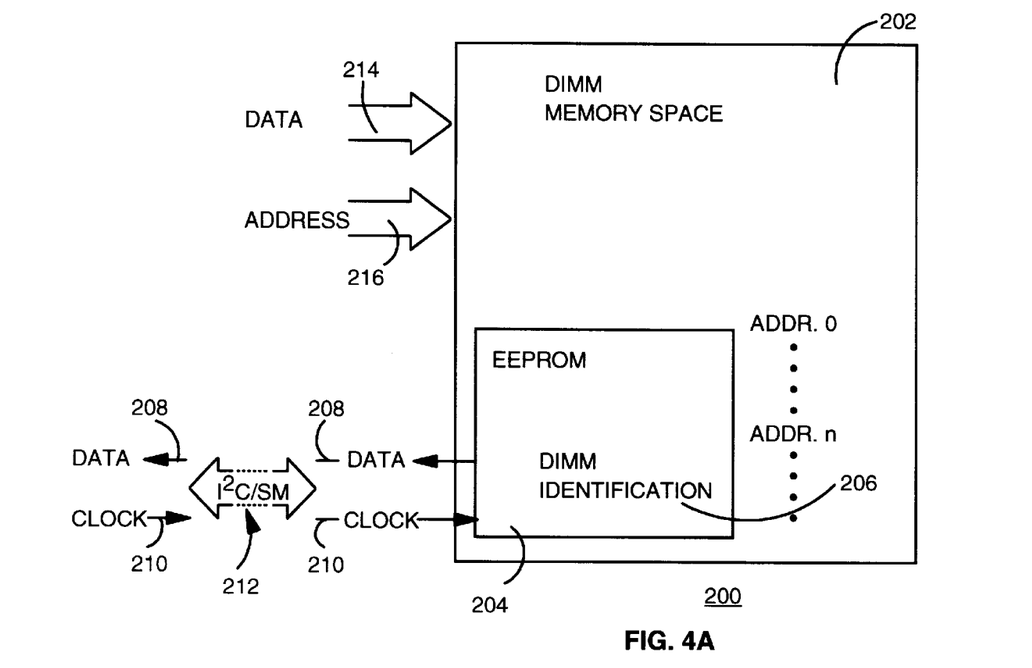
FIG. 4A illustrates a DIMM having an architecture in accordance with the preferred embodiment of the present invention.

FIG. 4A illustrates a DIMM 200 having an architecture in accordance with the preferred embodiment of the present invention. The DIMM 200 includes a memory space 202 which is accessed via data 214 and address 216 lines. The DIMM include the electronically readable identification 206 in a designated space within the EEPROM 204. The EEPROM 204 is accessed via data 208 and clock 210 lines of the serial bus 212 which, in the above mentioned computer (10) configuration, comprises the I²C or SM bus. The EEPROM 204 is conventionally addressed via the serial bus 212 using for example 0xA0, 0xA2, 0xA4 or 0xA6 as addresses. The EEPROM 204 has an address space which is divided into vendor used and unused areas as is further described herein below.

Figure 4B:
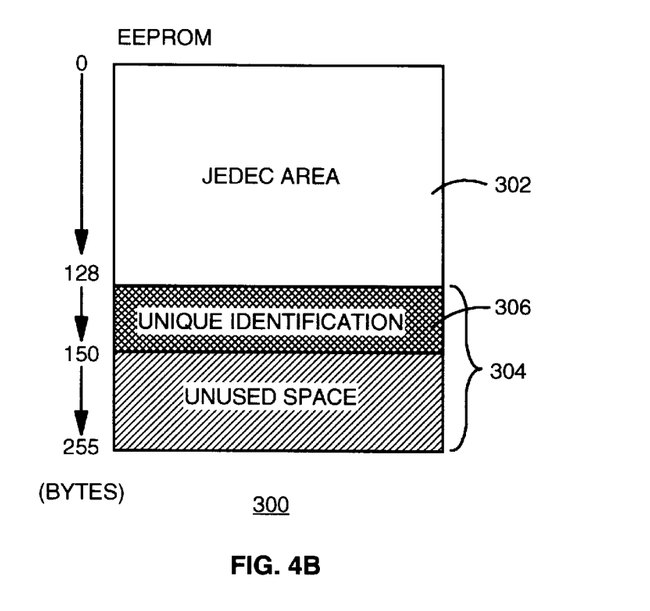
FIG. 4B is a diagram of the EEPROM address space architected in accordance with the preferred embodiment of the present invention.

FIG. 4B is a diagram of the EEPROM address space 300 architected in accordance with the preferred embodiment of the present invention. In the preferred embodiment, the EEPROM includes 256 bytes, from byte 0 to byte 255. The first 128 bytes, byte 0 to byte 127, define a first address space 302 which is used by the vendor for storage of vendor-supplied information. The first address space is typically organized in 5 accordance with JEDEC (joint electronic devices engineering council) standard. Hence, the first address space 302 is referred to as the JEDEC area. Bytes 128 to 255 define a second address space 304 which is unused by the vendor and thus can be suitably utilized for storing the unique identification.

An important aspect of the present invention is using the information stored in the EEPROM to generate and report the identification of memory modules within the computer. Preferably, this information comprises the unique identification. Therefore, in accordance with the present invention, in the preferred embodiment, byte 128 to 150 define a storage area 306 for the unique identification of the memory module. Alternatively, without departing from the scope and spirit of the present invention, a memory module can also be used with an EEPROM in which part or all of its second address space 304 remains unused. In this case, the information stored in the second address space 304 is used to generate an alternate unique identification. Each of the unique identification and alternate unique identification comprises characters and is formatted as hereafter described.

Figure 4C:
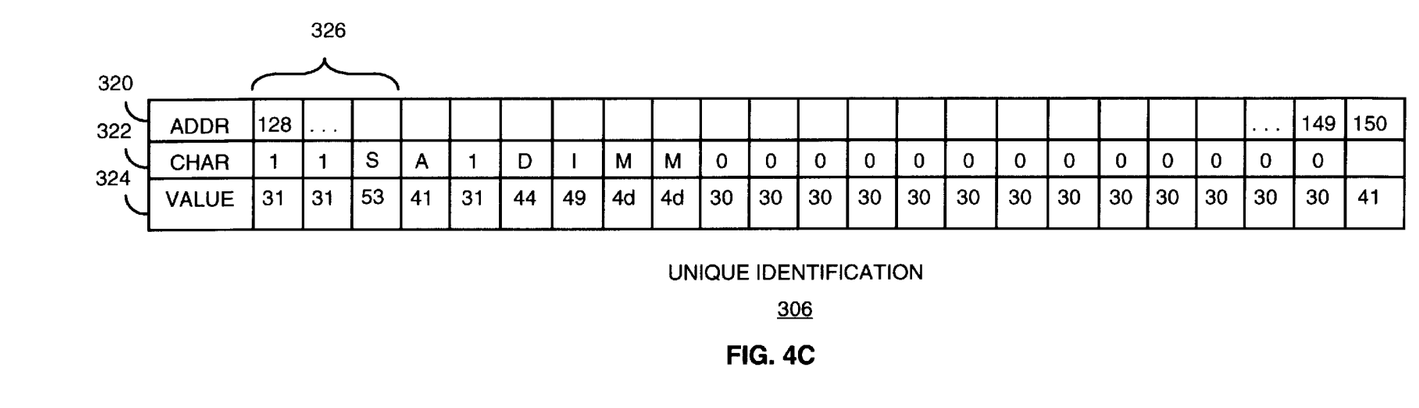
FIGS. 4C and 4D illustrate the format of the unique identification and alternate unique identification, respectively, as derived from the EEPROM information.
Figure 4D:
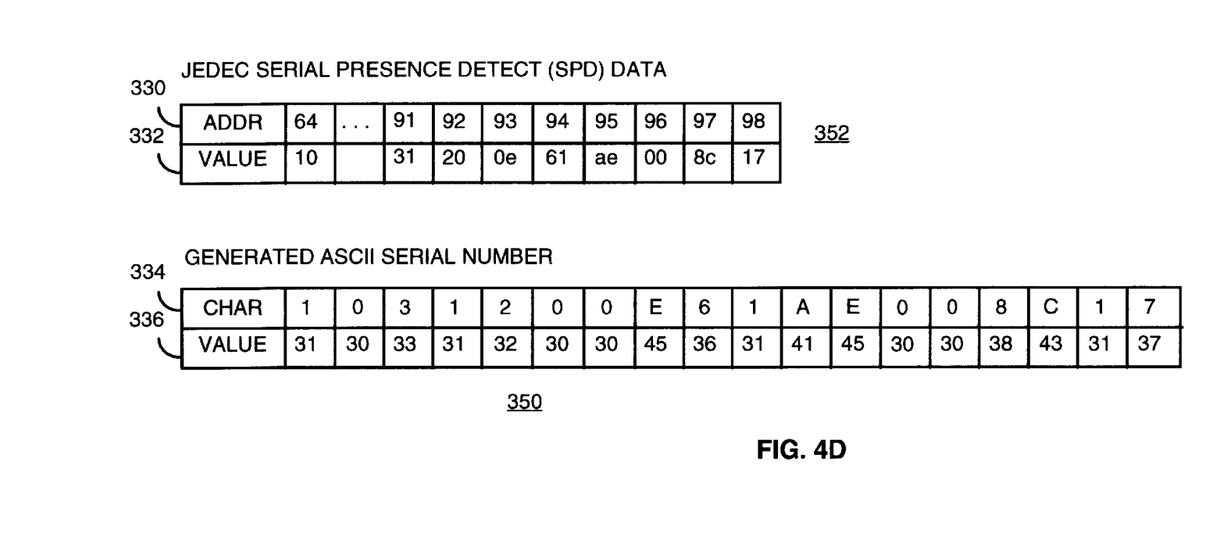

FIGS. 4C and 4D illustrate the format of the unique identification and alternate unique identification, respectively, as derived from the EEPROM information. As illustrated in FIG. 4C, the unique identification number 306 is preferably resident in a 23-byte field of bytes 128-150. The rows are shown as an EEPROM address row 320, a character row 322, and a value row 324, respectively. Along the address row 320, each byte, byte 128 . . . byte 150, occupies one position. In the character row 322, the characters shown below each of the bytes are an ASCII representation of the characters stored in the respective bytes. Listed in the value row 324, are the hexadecimal value of each of the respective characters. A 3-byte header 326 containing for example the character "11S" is stored in bytes 128-130. The presence of the particular header in these bytes indicates the existence of the unique identification. The absence of this header indicates that the second address space is unused and does not include the unique identification. The 3-byte header is followed by a 19-bytes serial number. The 23 rd byte, byte 150, comprises a binary checksum which is computed for example as the 1's compliment of the preceding 22 bytes of characters.

As before stated, the alternate unique identification is generated when the unique identification is not available. FIG. 4D, illustrates JEDEC formatted information 352 which is stored in the first 128 bytes of the EEPROM and used to generate the alternate unique identification 350.

The addresses of the JEDEC formatted information 352 are listed in the address row 330. The hexadecimal values of the respective characters are listed below the address row 330 in the value row 332. Preferably, the 18-byte alternate unique identification 350 is derived from bytes 64-98 of the JEDEC formatted information 352, wherein the 18 bytes include characters 334 indicating, for example, a memory module vendor, revision, date, and vendor specified serial number. The characters 334 indicating the memory module vendor, revision, date, and vendor specified serial number occupy, for example, 2, 4, 4 and 8 bytes, respectively, starting from byte 0. The characters 334 have respective values 336 listed in a row beneath them.

Figure 4E:
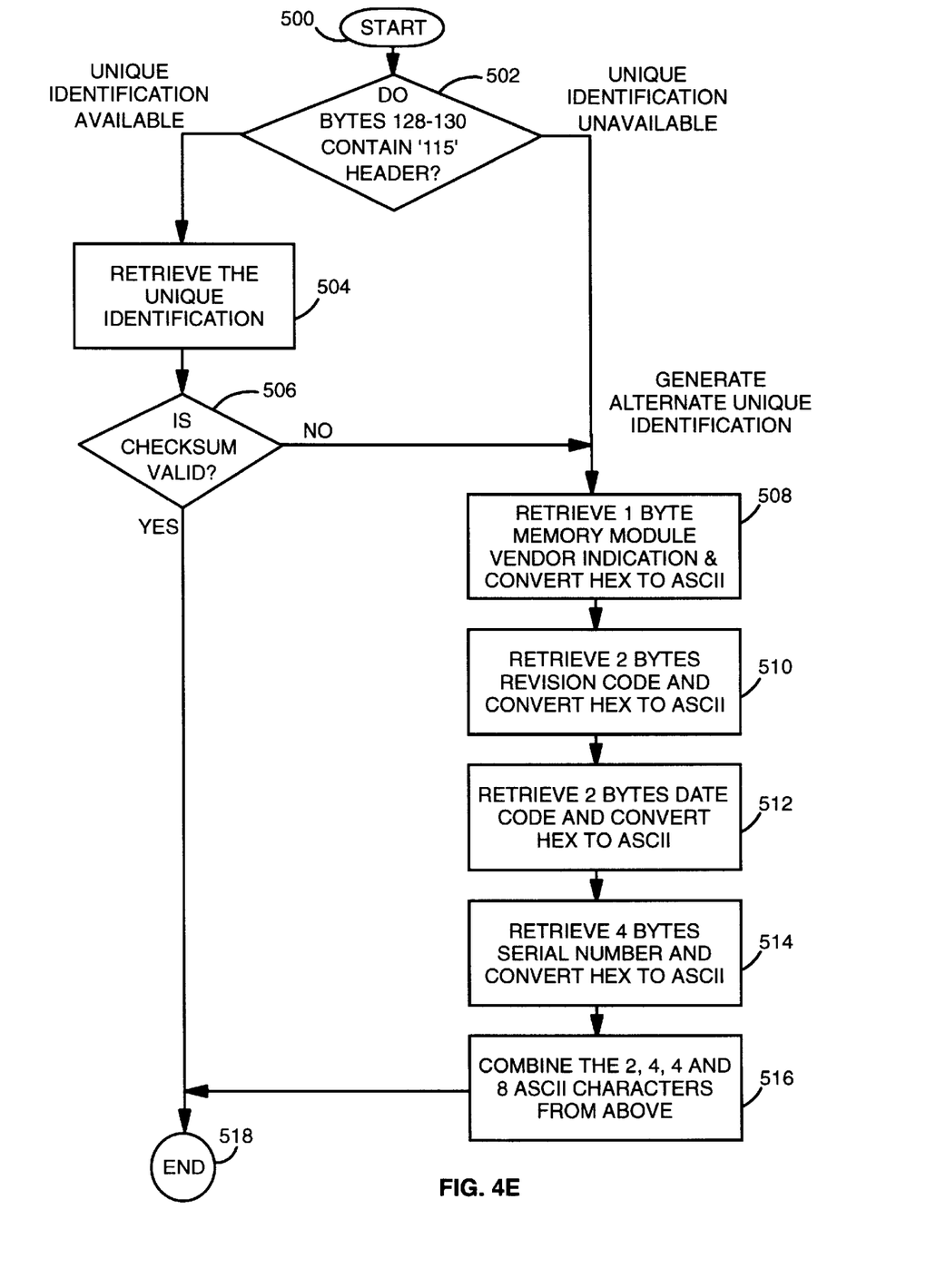
FIG. 4E is a flow diagram of a preferred method of generating and reporting the unique identification and the alternate unique identification of FIGS. 4C and 4D.

A preferred method of generating and reporting the unique identification and the alternate unique identification as described above is hereafter outlined in FIG. 4E. One of ordinary skill in the art will recognize, however, that character combinations other than the above described are also possible without departing from the scope and spirit of the present invention. As illustrated in FIG. 4E, the method commences via step 500. Then, in order to report the identification of each memory module a determination must first be made as to the nature of the information stored in the EEPROM and based on that the proper identification information is derived.

Accordingly, it is determined if the first three bytes, byte 128 to byte 130, of the EEPROM contain the particular header characters, via step 502. In this case the particular header characters are "11S." If it is determined that the particular header characters are, for example, "11S," via step 502, this means that the unique identification is available in the designated area of the EEPROM, thus, the 23-byte unique identification is retrieved via step 504. Next, it is determined if the checksum in the 23 rd byte is valid, via step 506. For example, it is determined if the checksum equals to the 1's complement of the sum of the preceding 22 bytes. If it is determined that the checksum is valid, via step 506, then the unique identification can be provided for reporting the same and the method ends, via step 518.

Alternatively, if it is determined that the particular header characters are not present, via step 502, this means that the unique identification is not available in the designated area of the EEPROM, thus, an alternate unique identification must be generated. In this case, 1 byte of the memory module vendor indication is retrieved from EEPROM memory byte 64 and converted from hexadecimal into 2 ASCII characters, via step 508. Then, 2 bytes of the revision code are retrieved from EEPROM memory bytes 91 and 92 and converted from hexadecimal into 4 ASCII characters, via step 510. Next, 2 bytes of the date code are retrieved from EEPROM memory bytes 93 and 94 and converted from hexadecimal into 4 ASCII characters, via step 512. Additionally, 4 bytes of the vendor specified serial number are retrieved from EEPROM memory bytes 95–98 and converted from hexadecimal into 8 ASCII characters, via step 514. The resulting characters are combined to form the alternate unique identification, via step 516. These characters are preferably positioned in the order they where created with the serial number being positioned last. However, other combinations of characters are possible without departing from the scope and spirit of the present invention. Once the alternate unique identification has been generated it is ready to be reported. Hence, the method ends, via step 518.

The above described method applies to any memory module which includes an electronically readable identification or serialization information, although the system and method in accordance with the present invention is described with respect to the DIMMs wherein the DIMMs are preferably configured with the EEPROM having the designated address spaces. Moreover, for a plurality of memory modules within the computer, this method repeats for each of the plurality of memory modules.

Figure 4F:
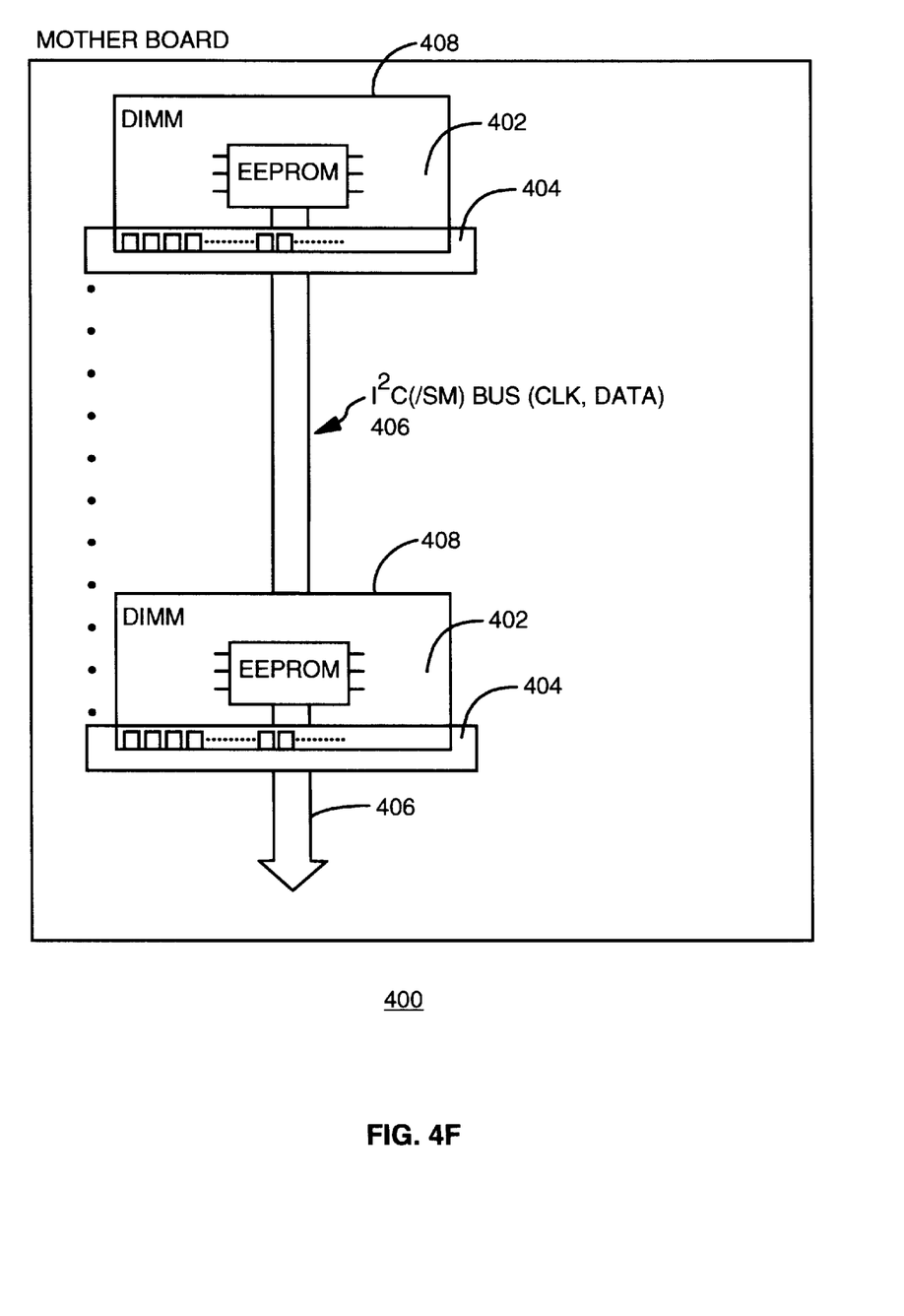
FIG. 4F illustrates a plurality of memory modules installed within the computer.

The number of memory modules installed within the computer is determined by the physical and electrical configuration of the computer as hereafter described in FIG. 4F. A computer having more than one memory module installed therein typically contains sockets 404 for receiving the memory modules 402, wherein the sockets are typically mounted on a mother board 400. The physical constraints of the mother board 400 determine how many memory module sockets are mounted thereon. In accordance with the present invention, each of the memory modules contains the electronically readable identification or serialization, preferably, in an EEPROM 408. Each of the EEPROMs is accessed via the clock and data lines of the I$^2$C or SM bus (serial bus ) 406. The I$^2$C or SM bus 406 runs through the mother board 400 from socket to socket 404 to provide the connection, via each of the sockets 404, to the EEPROM 408 on each of the memory modules 402. Accordingly, one or more of the unique identification and the alternate unique identification, which are collectively hereafter referred to as the identification, can be retrieved from the one or more memory modules 402.

As indicated, in the preferred embodiment, after generating the identification of the memory modules, the system and method report the identification via the DMI browser and/or the RF link to the RF reader. That is, the identification can be viewed locally by the computer operator via the browser, or it can be retrieved by a system administrator across the network using, for example, system management software that supports DMI protocol (e.g. LANDesk or IBM NetFinity system management software). In the preferred embodiment, the system and method further utilize a software program such as the AssetCare software program by IBM corporation for implementing the automated tracking and protection of the memory modules particularly the generating and reporting of the memory modules identification.

In a sequence, such as a power-up or system start-up sequence, commands or operations are initiated in order to obtain the computer configuration information including the memory module(s) identification. The configuration obtained during the sequence is stored for future reference in the RFID EEPROM, and preferably also in a computer file, as the last known configuration. Once the configuration is obtained it is used in a further process as hereafter described in conjunction with FIG. 5.

Figure 5:
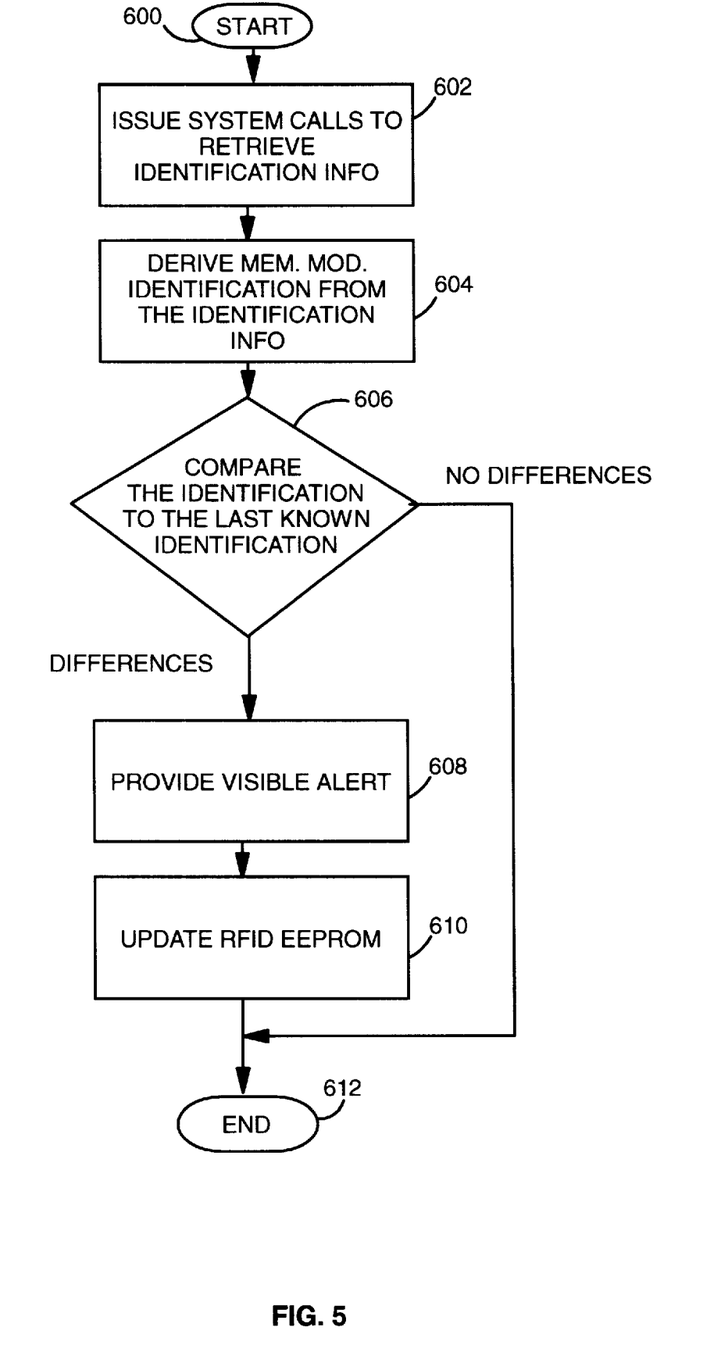
FIG. 5 illustrates a method of implementing the memory modules tracking via the identification information.

The method of implementing the memory modules tracking via the identification information is illustrated in FIG. 5. After the sequence commences, via step 600, appropriate system calls are issued to the various memory modules to retrieve their (current) identification information, via step 602. It is noted that different operating systems may handle the system calls in a different way because different operating system have different device driver layers and file control mechanisms.

Once the current identification information is obtained, the identification is derived therefrom (as described in more detail with reference to FIG. 4E), via step 604. Then, each identification is compared against the corresponding last known identification of the last known configuration, via step 606. If no differences are discovered, via step 606, the process ends, via step 612. However, if any differences are discovered, via step 606, a visible alert is provided indicating that one or more of the memory modules has been removed or replaced by another, via step 608. In addition, the RFID EEPROM is updated so that it contains the current identification(s), via step 610. Then the RF reader can obtain the information from the RFID EEPROM even when the computer is powered off.

The automated tracking and protection may utilize the RF link to the RF reader(s) in conjunction with RF gates to monitor memory modules as they pass through the RF gates in or out of a portal. The automated tracking and protection may also utilize the RF link to the RF reader(s) in conjunction with the hand held RF enabled device for retrieving the identification of memory modules proximate thereto. Additionally, the reporting of the information through the browser such as, the DMI browser in the preferred embodiment can be adopted as an industry-standard mechanism for accessing computer assets information for automated inventory purposes as well as for the automated tracking and protection. Hence, the above-described system and method create a paradigm for the automated electronic tracking and protection of computer assets and particularly memory modules.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for tracking memory modules in a computer, the method comprising the steps of:

a) identifying each of the memory modules based upon identification information added to each of the memory modules by their manufacturer to provide a unique serial number by each of the memory modules, the unique serial number being generated at the time of tracking by a user; and b) providing the unique serial number to a display via a browser.

2. The method of claim 1, wherein each of the memory modules comprises a dual in-line memory module (DIMM).

3. The method of claim 1, wherein the identification information comprises electronically readable information.

4. The method of claim 3, wherein the identification information is stored in an electronically erasable programmable read only memory (EEPROM) within each of the memory modules.

5. The method of claim 3, wherein the method further includes the step of:

c) copying the unique serial numbers to a radio frequency (RF) enabled memory, wherein the unique serial numbers can be logged utilizing an RF reader means.

6. The method of claim 5, wherein the identifying step (a) further includes the step of:

a1) electronically obtaining the unique serial number of each of the memory modules.

7. The method of claim 6, wherein the electronically obtaining step (a1) further includes the step of;

a1a) executing a sequence including a power-up sequence during which the identification information is retrieved from each of the memory modules.

8. The method of claim 7, wherein the electronically obtaining step (a1) further includes the step of:

a1b) generating the unique serial number from the identification information for each of the memory modules.

9. The method of claim 8, wherein the identification information includes a first and second identification information and wherein the generating step (a1b) further includes the step of:

a1b1) determining if a particular header comprising a particular set of characters exists in the first identification information;

a1b2) determining the validity of a checksum at the end of the first identification information if the particular header exists; and a1b3) providing the unique serial number if the particular header exists and the checksum is valid, wherein the serial number comprises the first identification information and wherein the first identification information is unique.

10. The method of claim 8, wherein the identification information includes a first and second identification information and wherein the generating step (a1b) further includes the step of:

a1b1) determining if a particular header comprising a particular set of characters exists at the head of the first identification information;

a1b2) determining the validity of a checksum at the end of the first identification information if the particular header exists; and a1b3) forming the unique serial number from the second identification information if the particular header exists and the checksum is invalid.

11. The method of claim 8, wherein the identification information includes a first and second identification information and wherein the generating step (a1b) further includes the step of:

a1b1) determining if a particular header comprising a particular set of characters exists in the first identification information; and a1b2) forming the unique serial number from the second identification information if the particular header does not exist.

12. The method of claim 8, wherein the electronically obtaining step (a1) further includes the step of:

a1b) comparing the unique serial numbers with corresponding last known serial numbers, wherein a mismatch in the serial numbers indicates that the corresponding memory modules have been replaced.

13. The method of claim 12, wherein the browser includes a desktop management interface (DMI) browser.

14. The method of claim 13, wherein the DMI browser is used for local viewing of the serial numbers on the display.

15. The method of claim 14, wherein the browser further includes a DMI protocol compatible system management means for viewing the serial numbers across a network.

16. The method of claim 12, wherein the RF enabled memory comprises an RF identification (RFID) EEPROM.

17. The method of claim 16, wherein the RFID EEPROM comprises a dual-ported non-volatile memory with both digital serial and RF interfaces, and wherein the RFID EEPROM can be updated via both a digital serial and RF interfaces.

18. The method of claim 12, wherein, the RF-enabled memory is linked to an RF reader through an antenna, and wherein the memory modules identification can be electronically monitored without having to form a direct physical contact with the memory modules.

19. A method for tracking memory modules in a computer, the method comprising the steps of:

a) identifying each of the memory modules based upon identification information added to each of the memory modules by their manufacturer to provide a unique serial number by each of the memory modules, the unique serial number of each of the memory modules being generated from the identification information obtained electronically from each of the memory modules, the identification information including a first and second identification information, wherein if in the first identification information a particular set of characters and a valid checksum are present then the unique serial number is generated from the first identification information, the particular set of characters comprising a header, and wherein if either one of the header and a valid checksum is not present then the unique serial number is formed from the second identification information, the unique serial number being compared with a corresponding last known serial number to determine if the corresponding memory module has been changed; and b) providing the unique serial number to a display via a browser.

20. A system for tracking memory modules in a computer, the system comprising:

means for electronically generating a unique serial number of each of the memory modules at the time of tracking by a user;

means coupled to the generating means for providing the unique serial number of each of the memory modules to a display via a browser; and means coupled to the providing means for copying the unique serial number of each of the memory modules to a radio frequency (RF) enabled memory, wherein the serial numbers can be logged utilizing an RF reader means.

21. The system of claim 20, wherein the memory modules include an electronically erasable programmable read only memory (EEPROM) for storing the unique serial numbers.

22. The system of claim 21, wherein at least one of the memory modules comprises a dual in-line memory module (DIMM).

23. A system for automated electronic tracking and protection of memory modules in a computer, the computer having a last known configuration including last known serial numbers corresponding to each of memory modules, the system comprising:

means for retrieving identification information from a designated memory space in each of the memory modules;

means coupled to retrieving means for generating current serial numbers from the identification information, wherein the current serial numbers are unique;

a radio frequency (RF) enabled memory coupled to the generating means, the RF enabled memory for storing the last known serial numbers and for updating the last known serial numbers with the current serial numbers;

an RF link from the RF enabled memory to an RF reader, the RF reader for receiving the updated last known serial numbers; and means for reporting the serial numbers coupled to the generating means.

24. A computer readable medium including program instructions for tracking memory modules in a computer, the program instructions for:
 a) identifying each of the memory modules based upon identification information added to each of the memory modules by their manufacturer to provide a unique serial number by each of the memory modules; the unique serial number being generated at the time of tracking by a user; and
 b) providing the unique serial number to a display via a browser.

25. A computer readable medium including program instructions for tracking memory modules in a computer, the program instructions for:
 a) electronically generating the unique serial number of each of the memory modules; the unique serial number being generated at the time of tracking by a user;
 b) providing the unique serial number of each of the memory modules to a display via a browser; and
 c) copying the serial number of each of the memory modules to a radio frequency (RF) enabled memory, wherein the serial numbers can be logged utilizing an RF reader means.

26. A method for tracking memory modules in a computer, the method comprising the steps of:
 (a) identifying each of the memory modules based upon identification information added to each of the memory modules by their manufacturer to provide a unique serial number by each of the memory modules;
 wherein the identification information comprises electronically readable information and the identification information is stored in an electronically erasable programmable read only memory (EEPROM) within each of the memory modules;
 wherein the identifying step(a) further includes:
  a1) electronically obtaining the unique serial number of each of the memory modules;
  wherein the electronically obtaining step (a1) further includes the step of;
   a1a) executing a sequence including a power-up sequence during which the identification information is retrieved from each of the memory modules;
  wherein the electronically obtaining step (a1) further includes the step of:
   a1b) generating the unique serial number from the identification information for each of the memory modules;
   wherein the identification information includes a first and second identification information and wherein the generating step (a1b) further includes the step of:
    a1b1) determining if a particular header comprising a particular set of characters exists in the first identification information;
    a1b2) determining the validity of a checksum at the end of the first identification information if the particular header exists; and
    a1b3) providing the unique serial number if the particular header exists and the checksum is valid, wherein the serial number comprises the first identification information and wherein the first identification information is s unique;
 (b) providing the unique serial number to a display via a browser; and
 (c) copying the unique serial numbers to a radio frequency (RF) enabled memory, wherein the unique serial numbers can be logged utilizing an RF reader means.

27. A method for tracking memory modules in a computer, the method comprising the steps of:
 (a) identifying each of the memory modules based upon identification information added to each of the memory modules by their manufacturer to provide a unique serial number by each of the memory modules;
 wherein the identification information comprises electronically readable information and the identification information is stored in an electronically erasable programmable read only memory (EEPROM) within each of the memory modules;
 wherein the identifying step(a) further includes:
  a1) electronically obtaining the unique serial number of each of the memory modules;
  wherein the electronically obtaining step (a1) further includes the step of;
   a1a) executing a sequence including a power-up sequence during which the identification information is retrieved from each of the memory modules;
   a1b) generating the unique serial number from the identification information for each of the memory modules;
   wherein the identification information includes a first and second identification information and wherein the generating step (a1b) further includes the step of:
    a1b1) determining if a particular header comprising a particular set of characters exists at the head of the first identification information;
    a1b2) determining the validity of a checksum at the end of the first identification information if the particular header exists; and
    a1b3) forming the unique serial number from the second identification information if the particular header exists and the checksum is invalid;
 (b) providing the unique serial number to a display via a browser; and
 (c) copying the unique serial numbers to a radio frequency (RF) enabled memory, wherein the unique serial numbers can be logged utilizing an RF reader means.

28. A method for tracking memory modules in a computer, the method comprising the steps of:
 (a) identifying each of the memory modules based upon identification information added to each of the memory modules by their manufacturer to provide a unique serial number by each of the memory modules;
 wherein the identification information comprises electronically readable information and the identification information is stored in an electronically erasable programmable read only memory (EEPROM) within each of the memory modules;
 wherein the identifying step(a) further includes:
  a1) electronically obtaining the unique serial number of each of the memory modules;
  wherein the electronically obtaining step (a1) further includes the step of,
   a1a) executing a sequence including a power-up sequence during which the identification information is retrieved from each of the memory modules;
   a1b) generating the unique serial number from the identification information for each of the memory modules;
   wherein the identification information includes a first and second identification information and wherein the generating step (a1b) further includes the step of:

a1b1) determining if a particular header comprising a particular set of characters exists in the first identification information; and a1b2) forming the unique serial number from the second identification information if the particular header does not exist;

(b) providing the unique serial number to a display via a browser; and (c) copying the unique serial numbers to a radio frequency (RF) enabled memory, wherein the unique serial numbers can be logged utilizing an RF reader means.

* * * * *